(12) United States Patent
Bacon

(10) Patent No.: US 7,918,502 B2
(45) Date of Patent: Apr. 5, 2011

(54) APPARATUS AND METHOD FOR ATTACHING A CHILD CAR SEAT TO LUGGAGE

(76) Inventor: Douglas Bacon, West Hartford, CT (US)

( * ) Notice: Subject to any disclaimer, the term of this patent is extended or adjusted under 35 U.S.C. 154(b) by 647 days.

(21) Appl. No.: 11/576,295

(22) PCT Filed: Sep. 29, 2005

(86) PCT No.: PCT/US2005/034943
§ 371 (c)(1),
(2), (4) Date: Mar. 29, 2007

(87) PCT Pub. No.: WO2006/039373
PCT Pub. Date: Apr. 13, 2006

(65) Prior Publication Data
US 2008/0315638 A1    Dec. 25, 2008

Related U.S. Application Data

(60) Provisional application No. 60/614,079, filed on Sep. 29, 2004.

(51) Int. Cl.
*A47C 7/62* (2006.01)
*A47C 13/00* (2006.01)
*A47D 1/10* (2006.01)

(52) U.S. Cl. ............... 297/217.1; 297/250.1; 297/188.2
(58) Field of Classification Search ............ 297/217.1, 297/188.06, 188.2, 256.16, 256, 254, 250.1, 297/255, 485; 190/8
See application file for complete search history.

(56) References Cited

U.S. PATENT DOCUMENTS

| | | | | |
|---|---|---|---|---|
| 2,960,149 A * | 11/1960 | Throssel | .................. | 297/440.12 |
| 5,311,972 A * | 5/1994 | Plath | .............................. | 190/102 |
| 5,611,597 A * | 3/1997 | Lanz | ......................... | 297/256.17 |
| 5,676,426 A | 10/1997 | Herring | | |
| 6,241,313 B1 * | 6/2001 | Lenz et al. | .................. | 297/217.1 |
| 6,450,576 B1 * | 9/2002 | Rhein et al. | ................. | 297/250.1 |
| 6,536,568 B1 * | 3/2003 | Tong | .............................. | 190/101 |
| 6,631,959 B1 * | 10/2003 | Tanaka et al. | ................. | 297/485 |
| 6,767,058 B2 * | 7/2004 | McClellan-Derrickson | . | 297/255 |
| 2004/0021353 A1 * | 2/2004 | Lozano et al. | ................. | 297/255 |
| 2005/0104333 A1 | 5/2005 | Schmidt | | |

OTHER PUBLICATIONS

International Search Report and Written Opinion for PCT/US05/34943 dated Sep. 27, 2006.

* cited by examiner

*Primary Examiner* — Milton Nelson, Jr.
(74) *Attorney, Agent, or Firm* — Cantor Colburn LLP

(57) ABSTRACT

An apparatus and method for attaching a child car seat (14) to luggage (12) is provided, including at least one strap (16) extending from an upper region of the luggage for attachment to a top (20) or back (22) portion of the child car seat, or to a separate strap extending from the top or back region of the child car seat. At least one additional strap may also extend from a side, front or bottom portion of such rolling luggage to attach to a side, back or bottom portion of the child car seat. In such embodiment, the at least one additional strap facilitates additional stability of the child car seat as attached to the rolling luggage. Additionally, a flat fabric material or bag (34) may be provided at least partially over the back of the luggage and may be attached to one or more of the various straps.

12 Claims, 6 Drawing Sheets

APPARATUS AND METHOD FOR ATTACHING A CHILD CAR SEAT TO LUGGAGE

BACKGROUND

The present disclosure describes novel apparatus and method for attaching a child car seat to luggage, more particularly, to "rollaboard" luggage having one or more wheels.

Conventional methods of travel require separate toting of luggage, child car seat and children. Parents traditionally are burdened during travel in having to manage luggage, carry a child car seat and either keep track of children or push children in a separate stroller. There is a need in the art for simplification of travel methods.

SUMMARY

The presently described apparatus and method alleviates the problems and deficiencies of the prior art by providing for attachment of a child car seat to a piece of luggage.

In one embodiment, attachment is made to rolling luggage and is facilitated by at least one strap extending from an upper region of the luggage for attachment to an top or back portion of the child car seat, or to a separate strap extending from said top or back region of the child car seat.

In another embodiment, at least one additional strap extends from a side, front or bottom portion of such rolling luggage to attach to a side, back or bottom portion of the child car seat. In such embodiment, the at least one additional strap facilitates additional stability of the child car seat as attached to the rolling luggage.

In another embodiment, at least two additional straps extends from side portions of such rolling luggage to attach to a side, back or bottom portion of the child car seat. In such embodiment, the at least two additional straps provide additional stability of the child car seat as attached to the rolling luggage.

In another embodiment, the at least one strap extending from the child car seat additionally extends to a flat fabric material or bag provided at least partially over the back of the luggage. In such embodiments providing at least one additional strap, such at least one additional strap may also extend to connect to the flat fabric material or bag on the back of the luggage. In such embodiments, the flat fabric material may facilitate securing of the child car seat to the luggage. Additionally or in the alternative, in the embodiment utilizing a bag, the bag may provide a convenient storage area.

In another embodiment, luggage includes at least one area on a front, side or back portion thereof for engagement to a fastener, such as a clip. Without limitation, the fastener engaging area may comprise a ring or part of a clip configured to engage a strap extending from a child car seat.

The above-discussed and other features and advantages of the apparatus and method for attaching a child car seat to luggage will be appreciated and understood by those skilled in the art from the following detailed description and drawings.

BRIEF DESCRIPTION OF THE DRAWINGS

Referring now to the drawings, wherein like elements are numbered alike in the several FIGURES.

DETAILED DESCRIPTION OF EXEMPLARY EMBODIMENTS

Reference will now be made in detail to exemplary embodiments, examples of which are illustrated in the accompanying drawings.

The presently described exemplary apparatus and method for attaching a child car seat to luggage includes at least one strap extending from an upper region of the luggage for attachment to an top or back portion of the child car seat, or to a separate strap extending from said top or back region of the child car seat.

Figure 1:
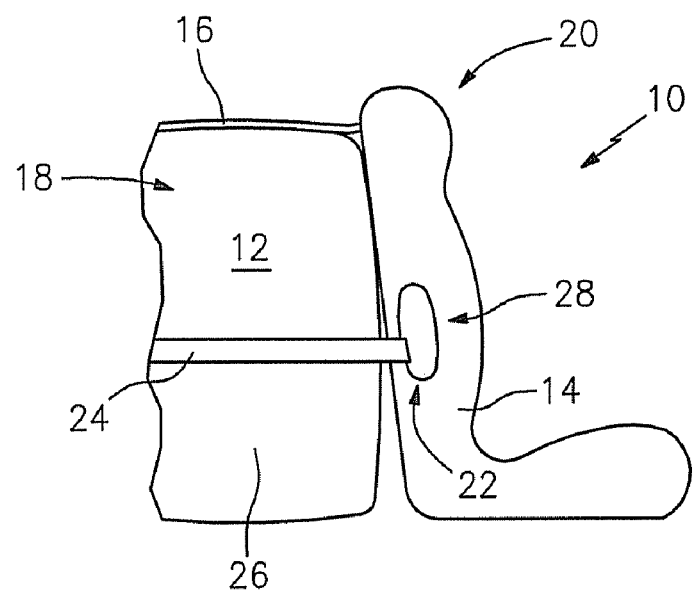
FIG. 1 illustrates an exemplary attachment of a child car seat to luggage.

With reference to FIG. 1, an exemplary embodiment of the presently disclosed child car seat and luggage attachment is illustrated generally at 10. In the illustrated embodiment, luggage 12 is attached to child car seat 14 by at least one strap 16 extending from an upper region, shown generally at 18, of the luggage for attachment to a top 20 or back 22 portion of the child car seat 14, or to a separate strap (not shown) extending from said top or back portion 22 of the child car seat.

Referring still to FIG. 1, an additional strap 24 extends from a side portion 26 of such luggage 12 to attach to a side portion 28 of the child car seat 14. In such embodiment, such additional strap 24 facilitates additional stability of the child car seat 14 as attached to the luggage 12.

Figure 2:
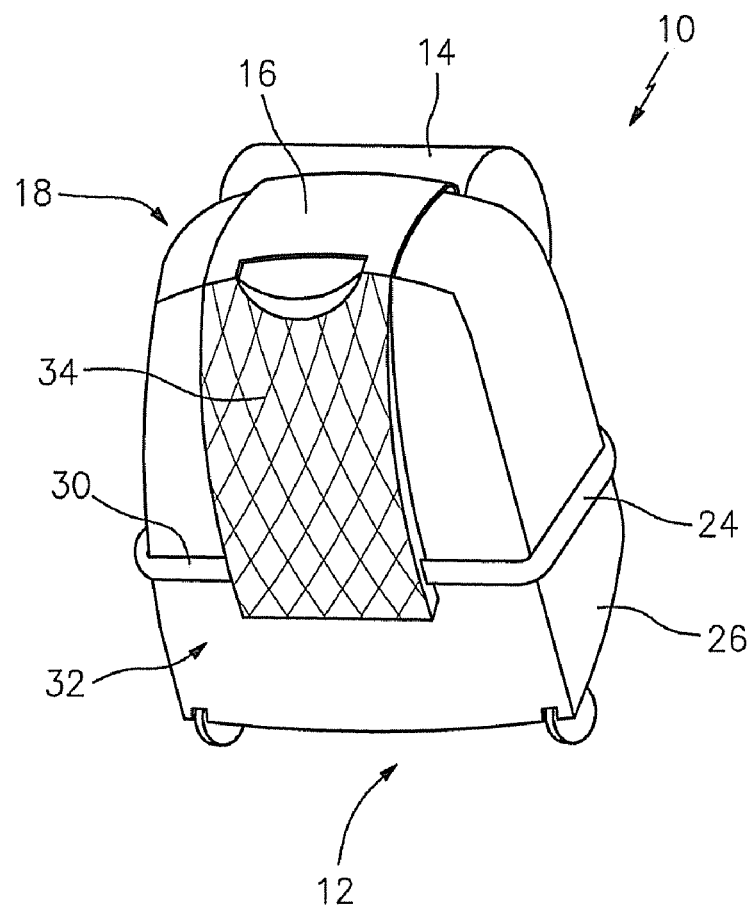
FIG. 2 illustrates an exemplary attachment of child car seat to luggage, including a bag positioned on the backside of the luggage.

Referring now to the exemplary embodiment illustrated at FIG. 2, a third strap 30 extends around a second side (not shown) of the luggage for attachment to a second side portion (not shown) of the child car seat 14. In such embodiment, the side straps 24, 30 provide additional stability of the child car seat 14 as attached to the luggage 12 (illustrated as rolling luggage).

It should be noted that the term "strap" is not intended to be limiting in any way, and may extend to any type of material. Indeed, in the embodiment illustrated at FIG. 2, the "strap" is illustrated as a sheet of fabric extending over the top portion 18 of the luggage 12. Nylon materials are acceptable, however so are other materials, including rubber, foam, cotton, polyester, etc. Additionally, the term "strap" should be construed herein to include materials having round or off-round cross sections, including corded materials. Wherever noted, the term "strap" should also be construed to encompass rigid or semi-rigid materials, such as plastics or metals. A "strap" may also be configured to double as shoulder straps, a belt or similar for a backpack use.

Referring still to the exemplary embodiment illustrated by FIG. 2, the strap extending over file top portion 18 of the luggage 12 to attach to the child car seat 14 additionally extends to back side 32 of the luggage 12. The strap 16 attaches to a bag 34 provided at least partially over the back portion 32 of the luggage 12. Additionally, side straps 24 and 30 are illustrated as extending to connect to bag 34 on the back portion 32 of the luggage 12. In such embodiments, the bag facilitates securing of the child car seat to the luggage and/or provides a convenient storage area.

Figure 4:
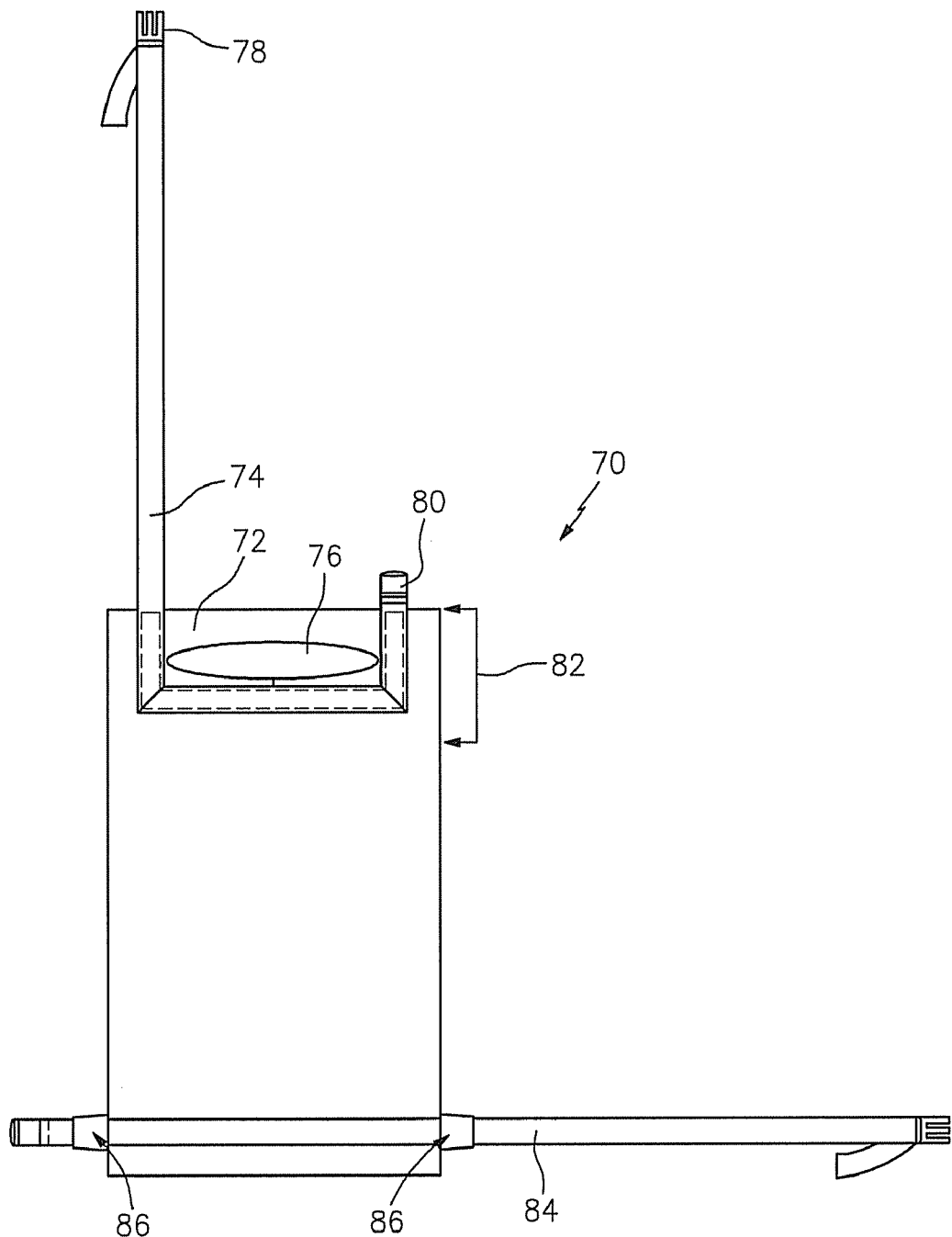
FIG. 4 illustrates a back view of an exemplary strap and fabric combination for attaching a child car seat to luggage.

With reference to FIG. 4, a rear view of an additional exemplary fabric and strap configuration is illustrated generally at 70. This exemplary embodiment utilizes a fabric 72 and rectangular cross section strap 74 combination to secure a child car seat to luggage. The fabric 72 has an aperture 76, which is sized and configured to permit a handle of rolling luggage (not shown) to extend therethrough. Exemplary strap 74 has a first end terminating in a prong clip 78 and a second end terminating in a buckle configured to releasably mate with the prong clip 80. Strap 74 and clip 78 are configured to allow for length adjustment, such that the strap 74 may be looped through a portion of the child car seat (e.g., car mounting apertures or rings). While the strap 74 is illustrated as being edgestitched to the fabric 72, any convenient method of mating the strap 74 and the fabric 72 is contemplated.

Referring still to the exemplary embodiment illustrated at FIG. 4, the fabric 72 may be uniform along its surface area, or it may be reinforced, for example along area 82, to ensure durability. Further, reinforced tabs 86 may be provided for strap 74 or for strap 84, which strap 84 may be configured to attach to the same portion of the child car seat as strap 74 or to another portion. Tabs 86 may be configured to allow straps to slide therethrough, or straps may be sewn to the straps and/or the fabric 72.

Figure 5:
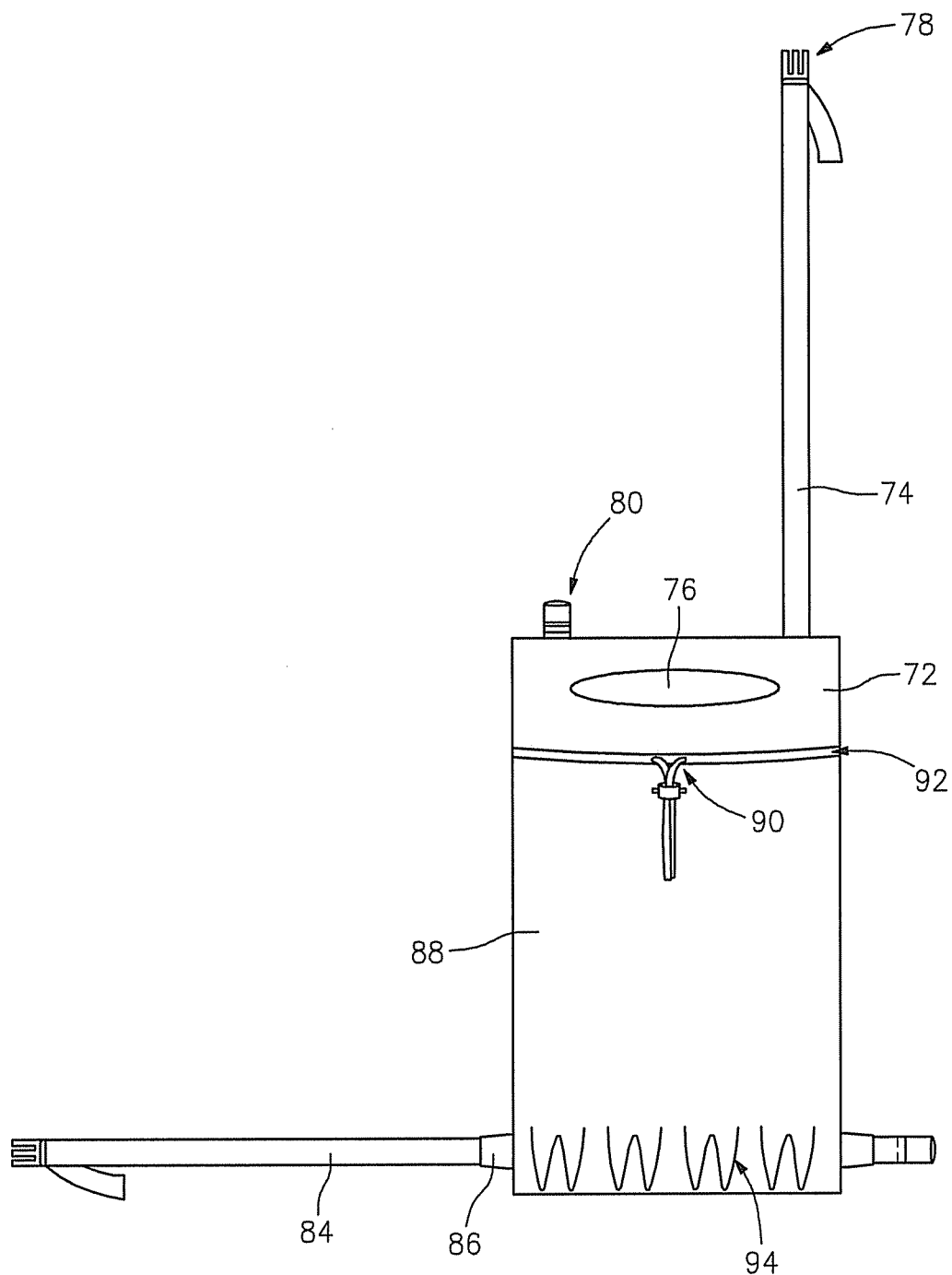
FIG. 5 illustrates a front view of the exemplary device of FIG. 4.

With reference to FIG. 5, a front view of the exemplary fabric and strap combination of FIG. 4 is illustrated generally at 70. At least one pocket is illustrated at 88. A tunnel casing/reinforcement 92 is illustrated at the top of pocket 88, and a drawcord with bungee toggle 90 is illustrated as provided therein. Additional pockets (not shown) may be included as well, including net pockets with or without elastic openings, a diaper bag, etc. Further, rather than or in addition to a drawcord or equivalent, a covering flap (not shown) may be provided over the aperture to the at least one pocket 88. Also, a portion of the pocket 88 may include shirring 94 for fullness, as desired.

Figure 3:
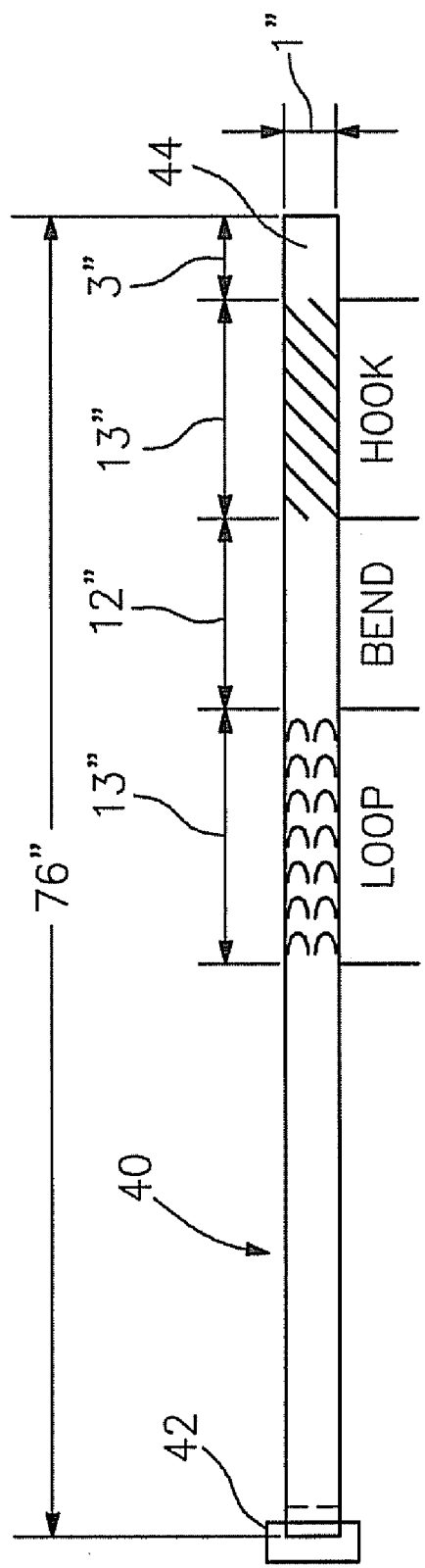
FIG. 3 illustrates an exemplary strap for attaching a child car seat to luggage.

Referring now to FIG. 3, an exemplary strap is illustrated generally at 40. The strap includes a ring 42. The end portion 44 away from the ring 42 may be configured to loop back through the ring 42, or may be configured to attach separately to one or both of the child car seat 14 and the luggage 12. In such embodiment where the strap is configured to engage the ring 42, the strap may be used to encompass the luggage and at least a portion of the child car seat, e.g., for use as side straps, or may be used to encircle an attachment point or loop on the top or back of the child car seat and an attachment point or loop on the top or back of the luggage. In either case, the ring may be configured to provide secure adjustability of the strap length (affecting tension on the child car seat to luggage attachment).

Alternatively, the attachment of either the child car seat to the luggage or the luggage to the child car seat may be effected by various clips or fasteners, as is known in the art. Additionally, attachment may be made using multiple straps, e.g., attachment of a strap from the child car seat to the luggage, or attachment of a strap from the child car seat to a second strap, which is attached to the luggage. Various buckles may also be integral or integrated on or in either of the child car seat and luggage.

Figure 6:
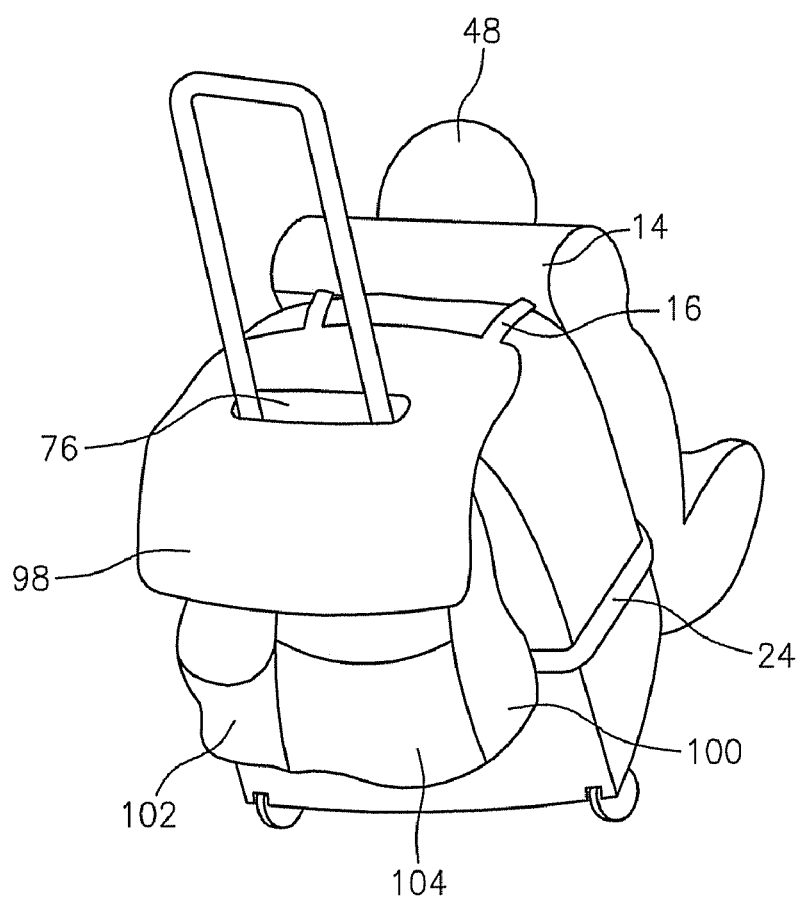
FIG. 6 illustrates a child carried by a child car seat, which is attached to rolling luggage.

FIG. 6 illustrates a child car seat 14, attached to rolling luggage 12 via top and side cords or straps 16, 24, wherein a child 50 rides in the child car seat 14. The advantages of the present apparatus and method are readily apparent by the illustrations. Of note is the aperture 76, through which the handle 96 of rolling luggage 12 extends, folding flap 98, covering a main compartment 100, and supplemental compartments 102 and 104 for easy external access to accessories. Such configuration advantageously eliminates the need to separately manage luggage, child car seat and children or stroller, and indeed, any necessary baby accessories.

Figure 7:
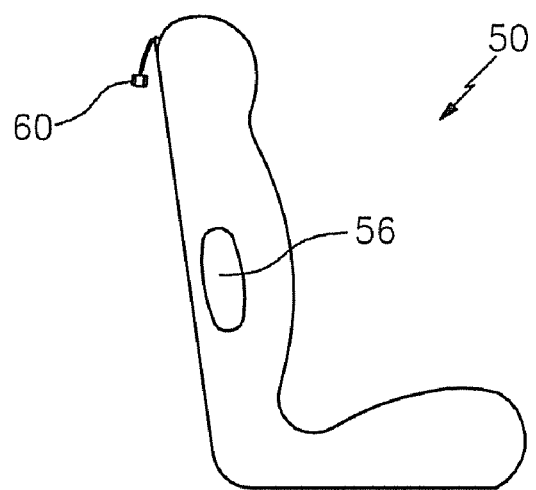
FIG. 7 illustrates a child car seat including at least one point of attachment 56 for a car seat.

Referring now to FIG. 7, an exemplary child car seat is illustrated generally at 50. The child car seat is illustrated as including at least one point of attachment 56 for a car seat (this is usually an aperture through the child car seat, although equivalents, such as d-rings or buckles are contemplated).

The child car seat may also have an independent point of attachment configured to attach to a piece of luggage, e.g., a clip or equivalent configured to engage one or more buckles attached to a loop which may extend around the handle of luggage, or a point of attachment on the child seat may be configured to engage a similar point of attachment on another piece of luggage. While a number of customized attachment configurations, for both the child car seat and the luggage, are contemplated herein, the present disclosure contemplates use of the strap system to attach to a non-customized child car seat (e.g., by attaching to or looping through child car bracket apertures, as described briefly above).

Figure 8:
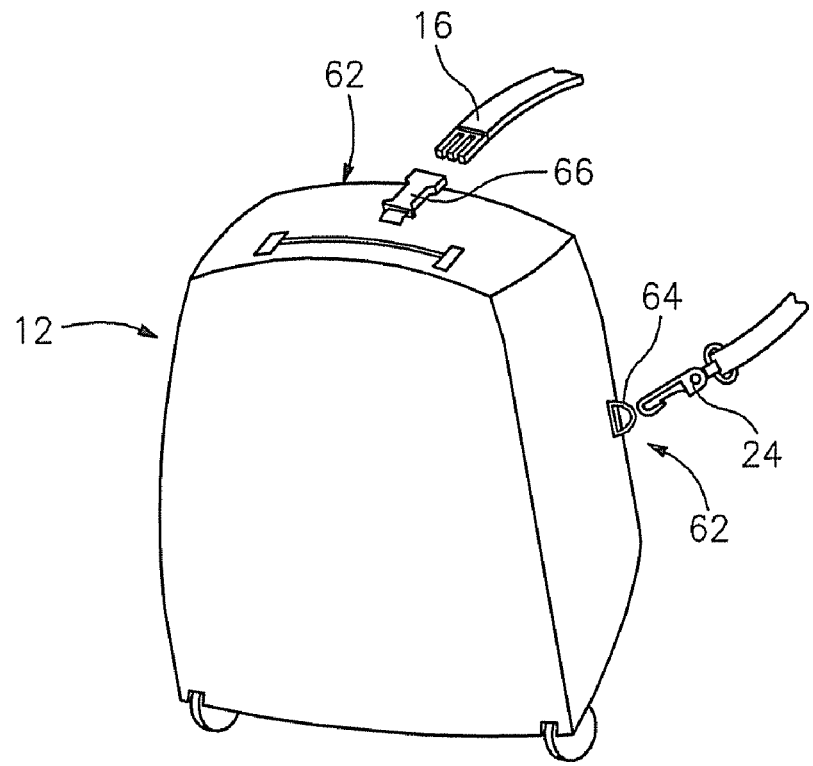
FIG. 8 illustrates rolling luggage including at least one point of attachment 56 for a car seat strap.

Referring now to FIG. 8, exemplary luggage 12 may also be provided with at least one area on a top, front, side or back portion thereof for engagement to a fastener, such as a clip. Without limitation, the fastener engaging area 62 may comprise a ring 64 or part of a clip 66 configured to engage a strap 16, 24 extending from a child car seat. In such a manner, the luggage may also be configured to securely engage (as with one or more rings on the luggage) straps that may otherwise also be commercially designed to engage secure points in vehicles (e.g., strap 24 may also be configured to extend through aperture 56 of the child seat in FIG. 8 to secure to points on an automobile). Thus, one or more fastener engaging areas 62 may be provided such that a strap may extend from the child car seat to the luggage, or at least partially around the luggage to secure the child seat thereto.

It will be apparent to those skilled in the art that, while exemplary embodiments have been shown and described, various modifications and variations can be made to the apparatus and method for attaching a child car seat to luggage disclosed herein without departing from the spirit or scope of the invention. Accordingly, it is to be understood that the various embodiments have been described by way of illustration and not limitation.

What is claimed is:

1. A child car seat in combination with luggage, the child car seat adapted to connect to said luggage, the child car seat comprising:
   a first strap extending from a top or back portion of said child car seat, said first strap configured for engagement with a top portion of said luggage, which is configured as rolling luggage, wherein said first strap extends to a flat fabric material or bag provided over at least a portion of the top of said luggage, the flat fabric material or bag including an aperture over a top portion of said luggage to facilitate extension of a handle therethrough.

2. The child car seat in accordance with claim 1, wherein said first strap is removably connected to said top or back portion of said child car seat.

3. The child car seat in accordance with claim 1, wherein said first strap is configured for removable connection with said top portion of said rolling luggage.

4. The child car seat in accordance with claim 1, wherein at least one additional strap extends from a side, back or bottom portion of said child car seat, and wherein said at least one additional strap is configured to connect to a side, front or bottom portion of said rolling luggage.

5. The child car seat in accordance with claim 4, wherein the at least one additional strap is configured to extend and connect to one or more rings provided on said rolling luggage.

6. The child car seat in accordance with claim 4, wherein said at least one additional strap is configured to removably connect to a side, front or bottom portion of said rolling luggage.

7. The child car seat in accordance with claim 4, wherein said at least one additional strap removably attaches to a side, back or bottom portion of said child car seat.

8. The child car seat in accordance with claim 4, wherein said at least one additional strap extends through at least one aperture provided in a side or back portion of said child car seat.

9. The child car seat in accordance with claim 1, wherein said fabric material or bag includes at least one pocket.

10. The child car seat in accordance with claim 9, wherein said fabric material or bag includes at least one closeable pocket and at least one pocket configured for open external access.

11. The child car seat in accordance with claim 1, wherein at least one additional strap extends from a side, back or bottom portion of said child car seat, and wherein said at least one additional strap is configured to connect directly or indirectly to at least a portion of said flat fabric material or bag.

12. A child car seat in combination with luggage, the child car seat adapted to connect to said luggage, the child car seat comprising:

a first strap extending from a top or back portion of said child car seat, said first strap configured for engagement with a top portion of said luggage, which is configured as rolling luggage, wherein said first strap extends to a flat fabric material or bag provided over at least a portion of the back of said luggage, the flat fabric material or bag providing tension on the back portion of said luggage to facilitate maintenance of tension in said first strap.

* * * * *